US012613613B2

(12) United States Patent
Martinez et al.

(10) Patent No.: US 12,613,613 B2
(45) Date of Patent: Apr. 28, 2026

(54) METHOD FOR CONTROLLING AN APPARATUS

(71) Applicant: THALES DIS FRANCE SAS, Meudon (FR)

(72) Inventors: Frédéric Martinez, Marseilles (FR); Laurent Leloup, Peypin (FR); Valentin Favreau, Issy-les-Moulineaux (FR); Richard Oung, Vlliers-sur-Marne (FR)

(73) Assignee: THALES DIS FRANCE SAS, Meudon (FR)

( * ) Notice: Subject to any disclaimer, the term of this patent is extended or adjusted under 35 U.S.C. 154(b) by 141 days.

(21) Appl. No.: 18/549,901

(22) PCT Filed: Feb. 10, 2022

(86) PCT No.: PCT/EP2022/053231
§ 371 (c)(1),
(2) Date: Sep. 9, 2023

(87) PCT Pub. No.: WO2022/189089
PCT Pub. Date: Sep. 15, 2022

(65) Prior Publication Data
US 2024/0160295 A1    May 16, 2024

(30) Foreign Application Priority Data
Mar. 10, 2021    (EP) ..................................... 21305291

(51) Int. Cl.
G06F 3/0482    (2013.01)
G06F 3/0485    (2022.01)
(Continued)

(52) U.S. Cl.
CPC .......... G06F 3/0482 (2013.01); G06F 3/0485 (2013.01); G06F 21/32 (2013.01)

(58) Field of Classification Search
CPC ....... G06F 3/0482; G06F 3/0485; G06F 21/32
See application file for complete search history.

(56) References Cited

U.S. PATENT DOCUMENTS

2008/0244714 A1 *   10/2008   Kulakowski ........... G06Q 30/06
                                                        705/50
2010/0134248 A1 *   6/2010    Adams .................... G06F 21/32
                                                        340/5.83
(Continued)

FOREIGN PATENT DOCUMENTS

EP        1421560 A1    5/2004

OTHER PUBLICATIONS

International Search Report (PCT/ISA/210) and Written Opinion (PCT/ISA/237) mailed on Jul. 14, 2022, by the European Patent Office as the International Searching Authority for current International Application No. PCT/EP2022/053231—[18 pages].

*Primary Examiner* — Oleg Survillo

(57) ABSTRACT

Provided is a method for controlling an apparatus configured to perform a plurality of actions. The method comprises the step of establishing a communication channel between the apparatus and a smart card embedding a biometric sensor, the step of retrieving, through the communication channel, a value reflecting a non-biometric data captured by the biometric sensor, and the step of identifying and performing, by the apparatus, one action of said plurality of actions depending on said value. Other embodiments disclosed.

13 Claims, 3 Drawing Sheets

(51) Int. Cl.
  *G06F 21/32*          (2013.01)
  *G06F 21/77*          (2013.01)

(56)                    References Cited

U.S. PATENT DOCUMENTS

| 2010/0138914 | A1* | 6/2010 | Davis ................... H04L 9/3231 |
| | | | 726/19 |
| 2013/0119130 | A1* | 5/2013 | Braams ........... G06Q 20/38215 |
| | | | 235/382 |
| 2014/0173717 | A1* | 6/2014 | Davis ..................... G06F 21/83 |
| | | | 726/18 |
| 2017/0026781 | A1* | 1/2017 | Plüss ................. H04W 12/069 |
| 2017/0286789 | A1 | 10/2017 | Wintergerst Lavin et al. |
| 2019/0065918 | A1* | 2/2019 | Humborstad ...... G06K 19/0718 |
| 2020/0387906 | A1 | 12/2020 | Vondrak et al. |

* cited by examiner

METHOD FOR CONTROLLING AN APPARATUS

FIELD OF THE INVENTION

The present invention relates to methods for controlling an apparatus. It relates particularly to methods for controlling an apparatus which has limited user input interface or is devoid of user input interface.

BACKGROUND OF THE INVENTION

An apparatus is a hardware device able to provide one or several services to a user. An apparatus may embed a user output interface like a display or a LED (Light-Emitting Diode) for instance. For example, the apparatus may be a small card reader device intended to manage access to services provided by smart cards or to update settings of a smart card.

For cost reasons or to avoid complex hardware architecture, the apparatus may be devoid of user input interface. An individual may want to select a particular feature of the apparatus.

There is a need to allow a user to interact with an apparatus which is devoid of user input interface.

The document EP142150A1 describes a smart card comprising a voice sensor configured to detect voice information.

The document US2020/387906A1 describes a method for biometric self-enrollment in a portable device coupled to an enrollment device.

SUMMARY OF THE INVENTION

The invention aims at solving the above mentioned technical problem.

An object of the present invention is a method for controlling an apparatus which is configured to perform a plurality of actions. The method comprises the following steps:

establishing a communication channel between the apparatus and a smart card that embeds a biometric sensor, retrieving, through the communication channel, a value reflecting a non-biometric data which has been captured by the biometric sensor, and identifying and performing, by the apparatus, one action of said plurality of actions depending on said value.

Advantageously, the portable apparatus may send to the smart card a request aiming at tracking action of a user on the biometric sensor, the portable apparatus may receive a response comprising said value and may perform identifying and performing according to the received response.

Advantageously, the non-biometric data may reflect detection of a predefined movement on the biometric sensor, the duration of an interaction between a user and the biometric sensor, activation of a specific part of the biometric sensor by the user or the number of interactions or frequency of an interaction between the user and the biometric sensor.

Advantageously, the performed action may be the providing of a user with a signal through a user output interface, a menu scrolling, selection of a service or a menu option, selection of a normal or sensitive option, or activation of an operating mode, a software application or a hardware component.

Advantageously, the communication channel may be established in contact mode or contactless mode.

Advantageously, the communication channel may be secured based on keys stored in the smart card and the apparatus.

Advantageously, the biometric sensor may be a fingerprint sensor.

An object of the present invention is a system comprising an apparatus configured to perform a plurality of actions. The system comprises a smart card embedding a biometric sensor. The apparatus is adapted to establish a communication channel with the smart card, to retrieve, through the communication channel, a value reflecting a non-biometric data captured by the biometric sensor, and to identify and perform one action of said plurality of actions depending on the non-biometric data.

Advantageously, the apparatus may be configured to send to the smart card a request aiming at tracking action of a user on the biometric sensor, to receive a response comprising said value and to perform identifying and performing according to said response.

Advantageously, the non-biometric data may reflect detection of a predefined movement on the biometric sensor, the duration of an interaction between a user and the biometric sensor, activation of a specific part of the biometric sensor by the user or the number of interactions or frequency of an interaction between the user and the biometric sensor.

Advantageously, the performed action may be the providing of a user with a signal through a user output interface, a menu scrolling, the selection of a service or a menu option, selection of a normal or sensitive option, or the activation of an operating mode, a software application or a hardware component.

Advantageously, the apparatus may embed the user output interface.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

Smart cards are portable small devices comprising a memory, a microprocessor and an operating system for computing treatments. They may comprise services applications like payment applications. Smart cards may be considered as secure elements. They comprise a plurality of memories of different types, like non-volatile memory and volatile memory. They are considered as tamper-resistant (or "secure") because they are able to control access to the data they contain and to authorize or not the use of their data by other machines. A smartcard may also provide computation services based on cryptographic components. In general, smartcards have limited computing resources and limited memory resources and they are intended to connect a host machine which may provide them with electric power either in contact mode or contactless mode.

The invention may apply to any type of apparatus intended to provide at least one service. The invention may apply to any type of smart cards. For example the smartcard may be a banking smart card, a transport card, an access badge, a loyalty card or an identity document.

The invention is well-suited for apparatus which have very limited user input interface or are devoid of user input interface. The invention may apply to portable apparatus which may embed a low number of hardware components.

Figure 1:
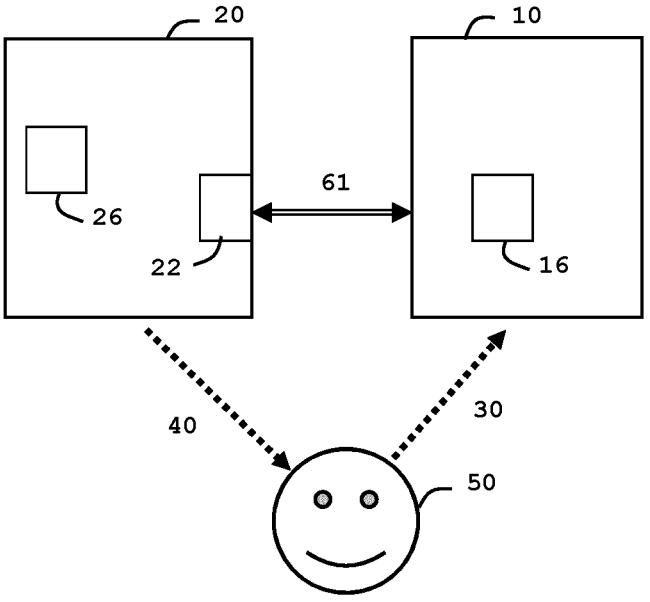
FIG. 1 shows a first exemplary architecture of a system according to an example of the invention.

FIG. 1 depicts a first exemplary architecture of a system according to an example of the invention.

In this example, the system comprises a smartcard 10 and a portable apparatus 20. The smart card 10 may be a payment card. The apparatus may be a device intended to power the card and to monitor settings of the smart card.

The smart card 10 embeds a biometric sensor 16 which may be a fingerprint scanner. The biometric sensor 16 is adapted to track actions 30 of a user 50.

The apparatus embeds a card reader 22 able to establish a communication link 61 with the card 10 in contact or contactless mode. The apparatus may embed a user output interface 26 allowing to provide the user 50 (I.e. an individual) with information. For example, the user output interface may include a display, a loudspeaker, a vibration system, a haptic feedback system or an image projector. The apparatus may provide the user with a signal 40 through the user output interface 26.

The apparatus 20 and the card may communicate using NFC (Near Field Communication) technology which is based on the exchanging of data via a modulated magnetic field. A NFC reader has an antenna which is able to modulate the magnetic field and to provide energy to NFC card. A contactless card and a contactless apparatus (comprising a NFC reader) may communicate thanks to an inductive coupling in a field frequency equal to 13.56 MHz. In particular, the ISO14443, ISO/IEC21481 and ISO18092 standards provide modulation technologies and communication protocols which may be used in NFC domain. The apparatus and the smartcard may also be coupled using the Very High Data Rate (VHDR) protocol as defined by the TF2N653 document.

The apparatus 20 and the card 10 may communicate using ISO/IEC-7816 protocols (like T=0 or T=1 for instance), through the SWP (Single Wire Protocol) or any relevant protocol in contact mode.

In some embodiments, the apparatus 20 may be a wearable device like a watch, a key fob or a bracelet.

Thanks to an embodiment of the invention, a user 50 can control the behavior of the apparatus by acting on the biometric sensor of the card.

Figure 2:
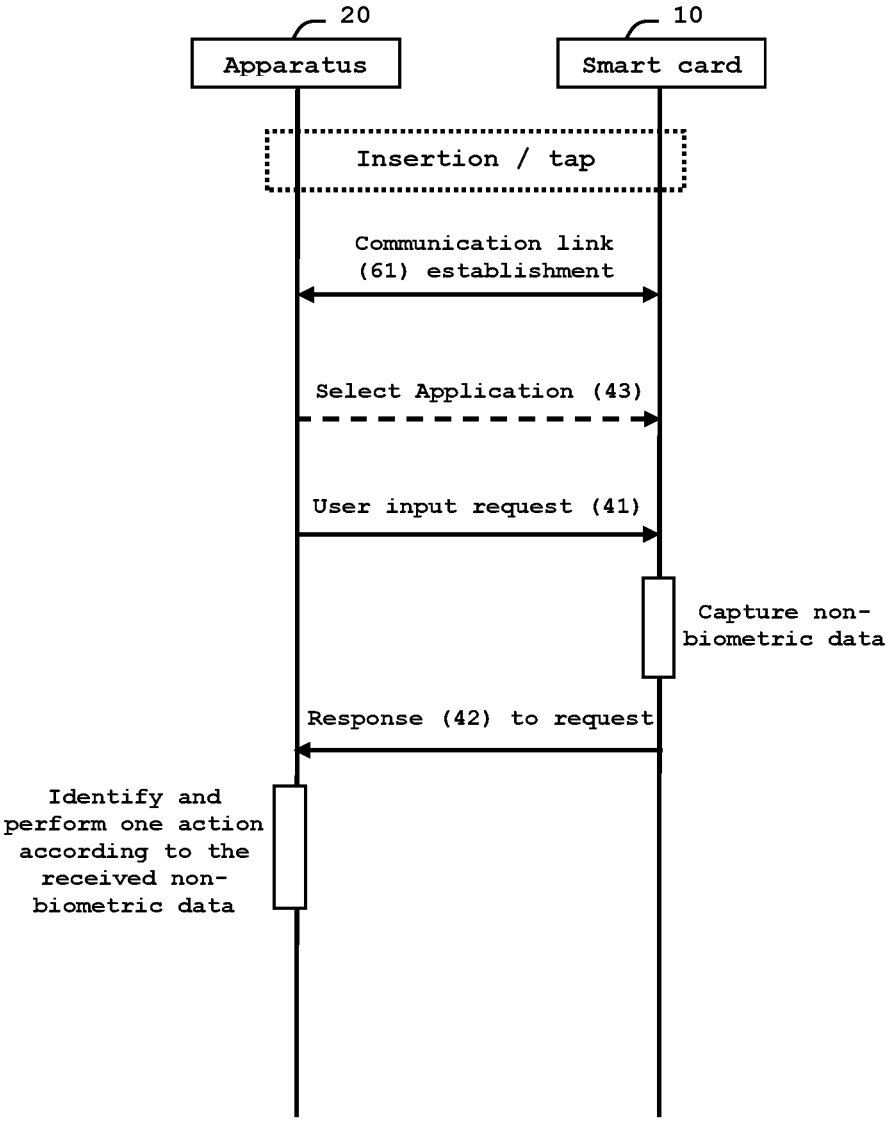
FIG. 2 shows an exemplary flow diagram for controlling an apparatus according to an example of the invention.

FIG. 2 depicts an exemplary flow diagram for controlling an apparatus according to an example of the invention.

In this example, the smart card 10 is a payment card embedding a fingerprint sensor 16.

The apparatus 20 embeds an internal battery or is connected to an external energy source. The apparatus 20 may include a card interface able to communicate using NFC technology.

For example, the apparatus 20 may be designed to provide the following features: allowing enrollment of biometric reference of a user in the card 10, removing a registered user's biometric reference from the card or verification by the card that captured biometric entry match the stored biometric reference.

The smartcard 10 may comprise a contactless communication interface designed to exchange data with the apparatus 20.

During a first step, a communication link 61 is established between the smart card 10 and the apparatus 20. Establishment of the communication link 61 may start in response to a tap which occurs when the smart card is placed within a proximity to the card reader unit of the apparatus 20 or when the card is inserted into apparatus 20.

Optionally, the apparatus may send a command 43 to the card in order to select a relevant application. Such a select command 43 may be useful when the card is designed to execute several functions for instance. For instance, the command 43 may select a software application which is designed to interact with the apparatus.

Then the apparatus 20 sends a user input request 41 to the smart card through the communication link 61. The user input request 41 aims at tracking action of the user 50 on the biometric sensor 16. Additionally, the apparatus may provide the user with instructions through its own user output interface 26 so that the user is aware of what she/he is supposed to do.

Upon receipt of the user input request 41, the card 10 places the biometric sensor in a state in which it awaits actions of the user.

Next, the biometric sensor may capture at least one non-biometric data corresponding to an action of the user.

In the present description, a non-biometric data is a data which is not intrinsic to the nature of the user's body. In other words, a non-biometric data is independent of the permanent characteristics of a specific user. Thus two different users may enter the same non-biometric data on the biometric sensor.

A non-biometric data captured by the biometric sensor may reflect detection of a predefined movement on the biometric sensor, the duration of an interaction between the user and the biometric sensor, activation of a specific part of the biometric sensor by the user or the number or frequency of an interaction between the user and the biometric sensor.

A non-biometric data captured by the biometric sensor may reflect the speed of a movement of the user.

When the biometric sensor 16 is a fingerprint capacitive sensor, the captured non-biometric data may be a specific gesture (i.e. movement) like sliding left, sliding right, sliding up or sliding down with a finger on the sensor.

The captured non-biometric data may be a short tap or a long tap (i.e. contact) on the surface of the fingerprint sensor.

The captured non-biometric data may the combination of several taps whose duration or spacing may be particular.

The captured non-biometric data may be the contact of a specific part of the sensor. For instance, assuming that a fingerprint sensor is large enough, four areas can be defined: Top left, top right, bottom left and bottom right. Thus the captured non-biometric data may a combination like "short contact with bottom left area" then "long contact with top right area".

Depending on the size of the surface of the sensor and of the applicative needs, other number of areas may be defined. For instance, two areas (left/right) or six areas (top left, top right, middle left, middle right, bottom left and bottom right) may be defined.

In some embodiments, the captured non-biometric data may be the combination of two contacts using two fingers on either two areas of a biometric sensor or on two biometric sensors.

The surface of some fingerprint sensors may be used as a capacitive touch pad. Fingerprint sensors using capacitive technology can be used as capacitive track pad. A fingerprint capacitive sensor can be seen as a very high-resolution capacitive track pad. The surface of the Biometric sensor may be divided into several zones (e.g. 6 or 9 zones for instance) and the sensor may be able to detect the presence/ contact/interaction of a finger in each zone.

Turning back to the flow diagram of FIG. 2, the smart card generates a response 42 to the user input request 41 and sends it back to the apparatus 20.

The response 42 may comprise data reflecting the captured non-biometric data or the absence of data captured by the sensor 16 during a predefined period.

In one embodiment, the card may start a timer upon receipt of the request 41, determine that no user interaction has been detected after a preset duration and generate the response 42 accordingly.

In one embodiment, the card may stay mute if no user interaction has been detected by the card after a preset duration. In such a case the apparatus may interpret the absence of response as an empty response.

In response to receipt of the response 42, the apparatus 20 identifies and performs one action according to the content of the received response 42.

The performed action may be the providing of the user with a signal 40 (depending on the response 42) through the user output interface 26. Thus the user may be informed via a visual channel or via an audio channel for instance.

The performed action may be the scrolling of a menu, the activation of a menu option or the selection of a menu entry.

The performed action may be the selection of a service or a function of the apparatus.

The performed action may be selection of a normal or sensitive option.

The performed action may be the activation of a selected operating mode, a software application or a hardware component of the system.

Thanks to some embodiments of the invention, a user may parse through the menu presented by the apparatus and select the relevant service that suits their needs.

For instance several pairs (user input request 41/response 42) may be exchanged in order to navigate in the menu of the apparatus. Via the capture of non-biometric data by the biometric sensor of the card, the user may change the current menu item, validate an action, abort an action or scroll to display more information on the screen of the apparatus. It is to be noted that such a scrolling capacity allow to implement a display having a small size in the apparatus and thus to reduce cost of the hardware components embedded in the apparatus.

In addition to the capture of the non-biometric data, the card may be configured to check that a concomitant and successful biometric verification occurs. For example the card may be adapted to validate the capture of a non-biometric data only when a successful biometric verification happens in order to authenticate the user. If no valid non-biometric data was captured during a predetermined duration, the card may build a response 42 which indicates the absence of captured non-biometric data or that an invalid non-biometric data has been captured. The apparatus may take an appropriate action based on the absence of valid captured non-biometric data. The checking of the biometric data is not necessary concomitantly: The card may be configured to check that the capture of the non-biometric data and the authentication of the user both occur during a preset limited period.

In some embodiments, the communication channel 61 may be established in contact mode upon insertion of the card 10 in the apparatus 20.

In some embodiments, the communication channel 61 may be secured based on keys stored in the smart card and the apparatus. For instance, messages exchanged through the communication channel 61 may be enciphered using cryptographic algorithms well known in the domain of smart cards. The exchanged data may be enciphered and/or signed with a symmetric algorithm or using a public/private key pair.

In one embodiment, an application embedded in the card 10 may request the apparatus to perform some specific actions or treatments. For instance, the apparatus 20 may select and activate a controlling application in the card 10. Then the controlling application may request the apparatus to display a message intended to be read by the user. Then, further to the detection of an interaction between the user and the biometric sensor, the controlling application may request the apparatus to display a second message selected according to the nature of the detected interaction. Then new exchanges could thus continue under the supervision of the controlling application which directs the actions of the apparatus.

Figure 3:
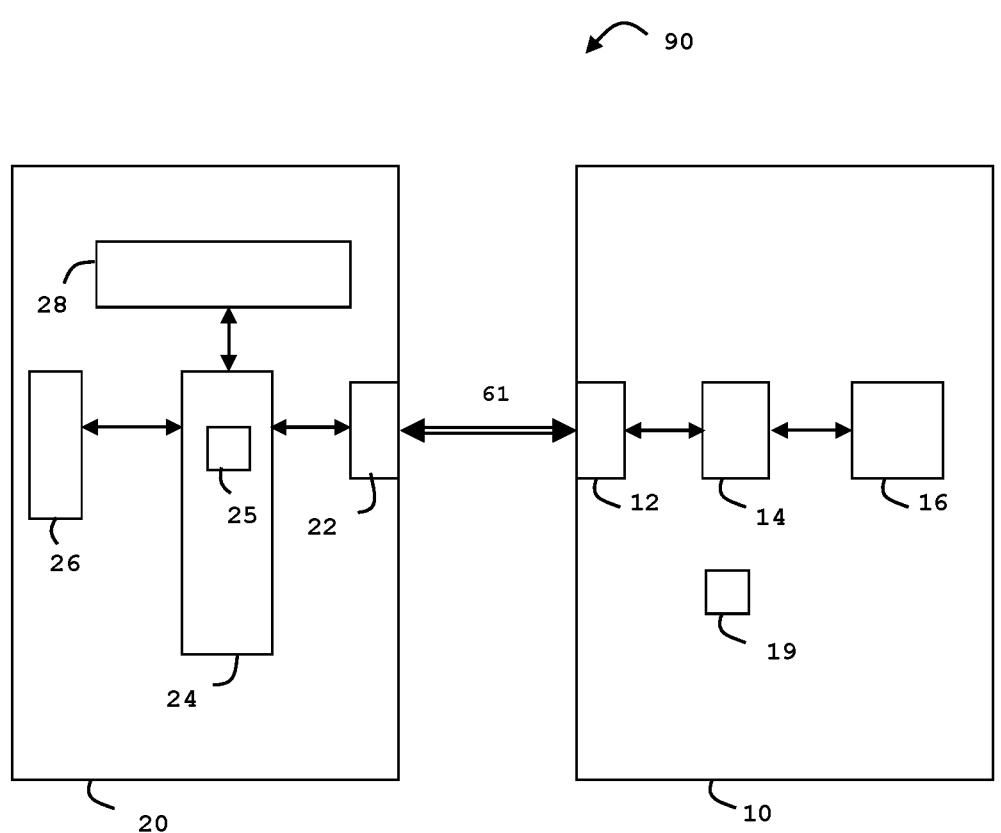
FIG. 3 shows a diagram of architecture of a system comprising an apparatus and a smart card according to an example of the invention.

FIG. 3 depicts a diagram of architecture of a system 90 comprising an apparatus and a smart card according to an example of the invention.

The system 90 comprises a smart card 10 and an apparatus 20.

In this example, the smart card 10 is an access badge allocated to a user and containing credentials allowing to get access to an area having a specific security level.

The smart card 10 comprises a secure chip 14 (also called secure element), a biometric sensor 16 and a physical communication interface 12 designed to communicate with the apparatus 20 in contact or contactless mode. The secure chip 14 is connected to both the biometric sensor 16 and the physical communication interface 12.

In some embodiment, the smart card 10 may comprise a sensor controller connected to both the biometric sensor 16 and the secure chip 14.

The smart card 10 may comprise a key 19 intended to be used to secure the data exchanged with the apparatus 20. The key 19 may be stored in a non-volatile memory embedded in the card 10.

The secure element 14 may be a conventional smart card chip with additional features. The secure element 14 may comprise a processor and a set of software and/or hardware instructions which are executed by the processor to perform the functions of the secure element.

The secure element 14 is configured to activate the biometric sensor in response to the receipt of a user input request 41 aiming at tracking action of the user. When activated, the biometric sensor is ready to detect any interaction with a user.

The secure element 14 is configured to retrieve a non-biometric data captured by the biometric sensor and to generate a response 42 reflecting the non-biometric data. The response 42 may contain the non-biometric data retrieved from the sensor or a value derived from the non-biometric data. For instance, the secure element 14 may be configured to convert the non-biometric data into predetermined codes according to the nature or the value of the captured non-biometric data. In such a case, the apparatus is configured to interpret the predetermined codes received in the response 42.

The secure element 14 may be configured to start a timer upon receipt of the request 41 and to decide that there is no action of the user if no non-biometric data has been made available by the sensor after a preset duration. In some embodiments, the secure element 14 may be configured to generate the response 42 reflecting the absence of available non-biometric data and to send the response to the apparatus. In some embodiments, the secure element 14 may be configured to remain mute without sending a response to the request 41.

In some embodiments, the duration may be set by the apparatus via a parameter conveyed in the request 41.

The apparatus 20 may be a wearable device comprising a card controller unit 24 including a chip and software instructions. The apparatus 20 may comprise a non-volatile memory 28, a physical user output interface 26 and a physical communication interface 22 able to exchange data with the smart card 10. The apparatus may be or include a card reader.

The physical user output interface 26 may include a display, a speaker, one or several LEDs and/or a haptic feedback device.

The apparatus 20 may store a key 25 in the card controller unit 24 or in the non-volatile memory 28 and may be adapted to decipher (and/or to check a signature of) the data received from the smart card 10 using the key 25.

In some embodiment, the apparatus 20 is said to be paired to the smart card 10 when it stores a secret value or a key allowing to securely access the content of the encipher/signed data sent by the smart card.

The apparatus 20 is able to establish a communication channel 61 with the smart card through its physical communication interface 22.

The apparatus 20 is configured to perform a plurality of actions. For example the action may be the providing of the user with a signal through the user output interface 26. The action may be a menu scrolling, the selection of a service, the selection of a menu option, or the selection of a normal or sensitive option. The action may be the selection/activation of an operating mode, a software application or a hardware component.

An action may also be a combination of the above listed feature.

Some actions may require the apparatus to perform both a change in its own current state and to send a further command to the card in order to ask the card to do something specific.

The apparatus may be configured to retrieve, through the communication channel 61, a value reflecting a non-biometric data which has been captured by the biometric sensor of the card and to select and perform one action according to the received value.

In some embodiments, the received value may be raw data captured by the biometric sensor of the smartcard or a predefined identifier associated to the captured non-biometric data. For instance, a set of predefined identifiers may be pre-stored in the apparatus during a personalization stage or uploaded after the manufacturing phase. The smart card may also store the same set of predefined identifiers.

Preferably, the apparatus may be configured to send to the smart card a user input request 41 aiming at tracking action(s) of a user 50 on the biometric sensor of the card, to receive a response 42 reflecting the non-biometric data and to select and perform an action according to said response.

In some embodiments, the apparatus may be configured to receive from the card a series of messages which correspond to a plurality of responses to the same initial user input request 41. In other word, the apparatus may be adapted to receive and interpret several response messages associated to a single request 41. For instance, each time a new interaction occurs between the biometric sensor and the user, the card may send a response 42 to the apparatus. Such an embodiment allows to minimize the number of messages exchanged between the apparatus and the card to save time and energy.

In some embodiments, the apparatus may be configured to analyze the content of the received response 42 and to identify the non-biometric data which has been captured by the sensor based on a corresponding code selected by the card. For instance, the card controller unit 24 may be adapted to compare the content of the response with a predefined set of codes/identifiers, each codes/identifier being associated with a particular non-biometric data that could be captured by the biometric sensor.

In one embodiment, the apparatus may start a timer upon sending of the request 41 and determine that no user interaction has been detected after a preset duration if the card remains mute (I.e. does not send a response) after a predefined duration.

In some embodiments, the user output interface used by the apparatus to present information to the user may be embedded in another hardware device. For instance, the user output interface may be embedded in the smart card and the apparatus may be configured to send through the communication link 61 a message requesting the presentation of a specific information by the user output interface of the card.

The invention is not limited to the described embodiments or examples. In particular, the described examples and embodiments may be combined.

The invention is not limited to Banking smart cards and applies to any smart cards comprising at least one biometric sensor.

The smart card may have several biometric sensors and capture several non-biometric data through different sensors and control the apparatus via a combination of non-biometric data captured by several sensors according to the mechanism described above.

The apparatus may be configured to identify the type of the connected card (for example though a specific command/response pair) and to identify a set of actions which are allocated to the card type only.

Although examples of the invention have been mainly provided in the banking domain, the invention also applies to other domains. For example, the smart card may provide access to a virtual area, a physical area like a building or a transport network.

The invention claimed is:

1. A method for controlling a card reader configured to perform a plurality of actions, the method comprising the steps of:

establishing a communication channel between the card reader and a smart card embedding a biometric sensor, wherein the biometric sensor is a fingerprint sensor;

sending by the card reader to the smart card a user input request aiming at tracking action of a user on the biometric sensor;

retrieving, by the card reader, in response to said user input request, through the communication channel, a value reflecting non-biometric data captured by the biometric sensor, wherein the non-biometric data are data which are not intrinsic to the nature of a user's body but correspond to an action of the user on the biometric sensor and reflect a detection of a predefined movement on the biometric sensor, a duration of an interaction between the user and the biometric sensor, an activation of a specific part of the biometric sensor by the user, a frequency of an interaction between the user and the biometric sensor, or a number of interactions between the user and the biometric sensor; and identifying and performing, by the card reader, one action of said plurality of actions depending on said value.

2. The method according to claim 1, wherein the performed action is the providing of the user with a signal through a user output interface, a menu scrolling, selection of a service or a menu option, selection of a normal or sensitive option, or activation of an operating mode, a software application or a hardware component.

3. The method according to claim 1, wherein the communication channel is established in contact mode or contactless mode.

4. The method according to claim 1, wherein the communication channel is secured based on keys stored in the smart card and the card reader.

5. The method according to claim 1, wherein the value contains raw non-biometric data captured by the biometric sensor.

6. The method according to claim 1, wherein the smart card converts the non-biometric data captured by the biometric sensor into a predetermined code then sets said value with the predetermined code, and wherein the card reader interprets the predetermined code to identify the action to be performed.

7. A system comprising a card reader configured to perform a plurality of actions, the system further comprising a smart card embedding a biometric sensor, wherein the biometric sensor is a fingerprint sensor, the card reader being adapted to establish a communication channel with the smart card, to send through the communication channel to the smart card a user input request aiming at tracking action of a user on the biometric sensor, to retrieve in response to said user input request, through the communication channel, a value reflecting a non-biometric data captured by the biometric sensor, and to identify and perform one action of said plurality of actions depending on the value, wherein the non-biometric data are data which are not intrinsic to the nature of a user's body but correspond to an action of a user on the biometric sensor and reflect a detection of a predefined movement on the biometric sensor, a duration of an interaction between the user and the biometric sensor, an activation of a specific part of the biometric sensor by the user, a frequency of an interaction between the user and the biometric sensor, or a number of interactions between the user and the biometric sensor.

8. The system according to claim 7, wherein the performed action is the providing of the user with a signal through a user output interface, a menu scrolling, the selection of a service or a menu option, selection of a normal or sensitive option, or the activation of an operating mode, a software application or a hardware component.

9. The system according to claim 7, wherein the communication channel is established in contact mode or contactless mode.

10. The system according to claim 7, wherein the communication channel is secured based on keys stored in the smart card and the card reader.

11. The system according to claim 7, wherein the card reader embeds a user output interface.

12. The system according to claim 7, wherein the value contains raw non-biometric data captured by the biometric sensor.

13. The system according to claim 7, wherein the smart card is configured to convert the non-biometric data captured by the biometric sensor into a predetermined code, and to set said value with the predetermined code, and wherein the card reader is configured to interpret the predetermined code to identify the action to be performed.

* * * * *